(12) United States Patent
Taguchi

(10) Patent No.: US 9,842,255 B2
(45) Date of Patent: Dec. 12, 2017

(54) CALCULATION DEVICE AND CALCULATION METHOD

(71) Applicant: FUJITSU LIMITED, Kawasaki-shi, Kanagawa (JP)

(72) Inventor: Akinori Taguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/920,106

(22) Filed: Oct. 22, 2015

(65) Prior Publication Data

US 2016/0188962 A1 Jun. 30, 2016

(30) Foreign Application Priority Data

Dec. 24, 2014 (JP) .................................. 2014-260783

(51) Int. Cl.
*G06K 9/00* (2006.01)
*G06T 7/73* (2017.01)
*G06T 7/246* (2017.01)

(52) U.S. Cl.
CPC ............ *G06K 9/0061* (2013.01); *G06T 7/246* (2017.01); *G06T 7/73* (2017.01); *G06T 2207/10016* (2013.01); *G06T 2207/30201* (2013.01)

(58) Field of Classification Search
CPC .. G06F 3/013; H04N 13/047; H04N 13/0484; H04N 21/252; G06T 2219/024; G06T 2207/30201; G06T 7/55
See application file for complete search history.

(56) References Cited

U.S. PATENT DOCUMENTS

| 8,219,438 B1* | 7/2012 | Moon ................ G06Q 30/0201 705/7.29 |
| 2007/0247524 A1 | 10/2007 | Yoshinaga et al. |
| 2013/0042296 A1* | 2/2013 | Hastings ................ G06F 21/10 726/1 |
| 2013/0114850 A1* | 5/2013 | Publicover ......... G06K 9/00604 382/103 |

FOREIGN PATENT DOCUMENTS

| JP | 2007-286995 | 11/2007 |
| JP | 2008-243058 | 10/2008 |
| JP | 2009-116510 | 5/2009 |
| JP | 2011-217764 | 11/2011 |
| JP | 2013-149050 | 8/2013 |

* cited by examiner

*Primary Examiner* — Iman K Kholdebarin
*Assistant Examiner* — Mai Tran
(74) *Attorney, Agent, or Firm* — Staas & Halsey LLP

(57) ABSTRACT

A calculation device includes a processor configured to identify a person in a plurality of images captured in time series respectively, obtain gaze information indicating a direction of a line of sight of the person, identify at least one of a time period in which the person directs the line of sight to a certain object and a number of times that the person directs the line of sight to the certain object, based on the gaze information and a position at which the certain object is placed, estimate a relationship of two or more persons who are identified in one image from among the plurality of images, based on a distance between the two or more persons, and calculate an index value indicating probability that the certain object is utilized, based on the relationship, and at least one of the time period and the number of times.

15 Claims, 19 Drawing Sheets

FIG. 4

| PRODUCT | UPPER LEFT LOCATION | LOWER RIGHT LOCATION |
|---|---|---|
| PRODUCT C1 | (x1,y1) | (x1+a,y1+b) |
| PRODUCT C2 | (x2,y2) | (x2+a,y2+b) |
| ⋮ | ⋮ | ⋮ |

FIG. 6A

TARGET PERSON S1

| TIME PERIOD | GAZING TARGT PRODUCT | DISTANCE WITH TARGET PERSON S2 |
|---|---|---|
| 1 | PRODUCT C1 | 50 |
| 2 | PRODUCT C1 | 50 |
| ...... | ...... | ...... |
| 10 | PRODUCT C2 | 80 |

FIG. 6B

TARGET PERSON S2

| TIME PERIOD | GAZING TARGT PRODUCT | DISTANCE WITH TARGET PERSON S1 |
|---|---|---|
| 1 | PRODUCT C1 | 50 |
| 2 | PRODUCT C1 | 50 |
| ...... | ...... | ...... |
| 10 | PRODUCT C2 | 80 |

FIG. 7

| PRODUCT | TARGET PERSON S1 | TARGET PERSON S2 | TOTAL |
|---|---|---|---|
| C1 | 9 | 9 | 18 |
| C2 | 1 |  | 1 |
| C3 |  | 1 | 1 |

FIG. 8

| PRODUCT | GROUP G1 | GROUP G2 | TOTAL |
|---|---|---|---|
| C1 | 9 | 4 | 13 |
| C2 | 1 | – | 1 |
| C3 | 1 | – | 1 |

FIG. 12

| PRODUCT | ATTRIBUTE |
|---|---|
| C1 | SHARING IS ALLOWED |
| C2 | SHAREING IS NOT ALLOWED |
| C3 | SHAREING IS NOT ALLOWED |

FIG. 14

| PRODUCT | GROUP G1 | TARGET PERSON S1 | TARGET PERSON S2 |
|---|---|---|---|
| C1 | 9 | – | – |
| C2 | – | 1 | – |
| C3 | – | – | 1 |

FIG. 17A

TARGET PERSON S1

| TIME PERIOD | DISTANCE | MOUTH STATE |
|---|---|---|
| 1 | 50 | CLOSED |
| 2 | 50 | OPENED |
| 3 | 50 | CLOSED |
| 4 | 50 | OPENED |
| 5 | 50 | CLOSED |
| ...... | ...... | ...... |
| 10 | 50 | CLOSED |

FIG. 17B

TARGET PERSON S2

| TIME PERIOD | DISTANCE | MOUTH STATE |
|---|---|---|
| 1 | 50 | CLOSED |
| 2 | 50 | CLOSED |
| 3 | 50 | OPENED |
| 4 | 50 | CLOSED |
| 5 | 50 | OPENED |
| ...... | ...... | ...... |
| 10 | 50 | CLOSED |

FIG. 19

| PRODUCT | TARGET PERSON S1 | TARGET PERSON S2 | TOTAL |
|---|---|---|---|
| C1 | 1 | 1 | 2 |
| C2 | 1 | 0 | 1 |
| C3 | 0 | 1 | 1 |

CALCULATION DEVICE AND CALCULATION METHOD

CROSS-REFERENCE TO RELATED APPLICATION

This application is based upon and claims the benefit of priority of the prior Japanese Patent Application No. 2014-260783, filed on Dec. 24, 2014, the entire contents of which are incorporated herein by reference.

FIELD

The embodiments discussed herein are related to a technology by which utilization probability is calculated.

BACKGROUND

A technology using the number of persons who are gazing at a product as information on the degree of attention for the product is known (for example, Japanese Laid-open Patent Publication No. 2007-286995).

SUMMARY

According to an aspect of the invention, a calculation device comprising: a memory; and a processor coupled to the memory and configured to identify a person in a plurality of images captured in time series respectively, obtain gaze information indicating a direction of a line of sight of the person, identify at least one of a time period in which the person directs the line of sight to a certain object and a number of times that the person directs the line of sight to the certain object, based on the gaze information and a position at which the certain object is placed, estimate a relationship of two or more persons who are identified in one image from among the plurality of images, based on a distance between the two or more persons, and calculate an index value indicating probability that the certain object is utilized, based on the relationship, and at least one of the time period and the number of times.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a first diagram illustrating a product location database;

FIGS. 6A and 6B are diagrams illustrating examples of gazing state tables when two target persons have been detected in a captured image;

FIG. 7 is a diagram illustrating an example of a calculation result (individual table) of the utilization probability for each target person;

FIG. 8 is a diagram illustrating an example of a calculation result (group table) of the utilization probability for each group;

FIG. 12 is a diagram illustrating an example of a product attribute table;

FIG. 14 is a diagram illustrating an example of a calculation result (table) of utilization probability that is different depending on the attribute of a product;

FIGS. 17A and 17B are diagrams illustrating examples of databases generated by the processing illustrated in FIG. 16;

FIG. 19 is a diagram illustrating a further example of the gazing state table.

DESCRIPTION OF EMBODIMENTS

When a probability that a certain object is utilized (purchased and the like) by a person (hereinafter referred to as "utilization probability") is digitalized, a state in which the person directs the line of sight to the object (for example, a time period in which the line of sight is directed to the object, the number of times that the line of sight is directed to the object, and the like) may be used. Typically, as the time period in which the line of sight of a certain person is directed to an object becomes longer, the utilization probability of the object by the person becomes higher. In addition, typically, as the number of persons each directing the line of sight to the object become larger, the utilization probability of the object becomes higher.

An object of the technology discussed herein is to provide a utilization probability calculation device that accurately digitalizes the utilization probability of an object, based on a state in which a person directs the line of sight to the object.

The embodiments are described in detail with reference to the accompanying drawings.

Figure 1:
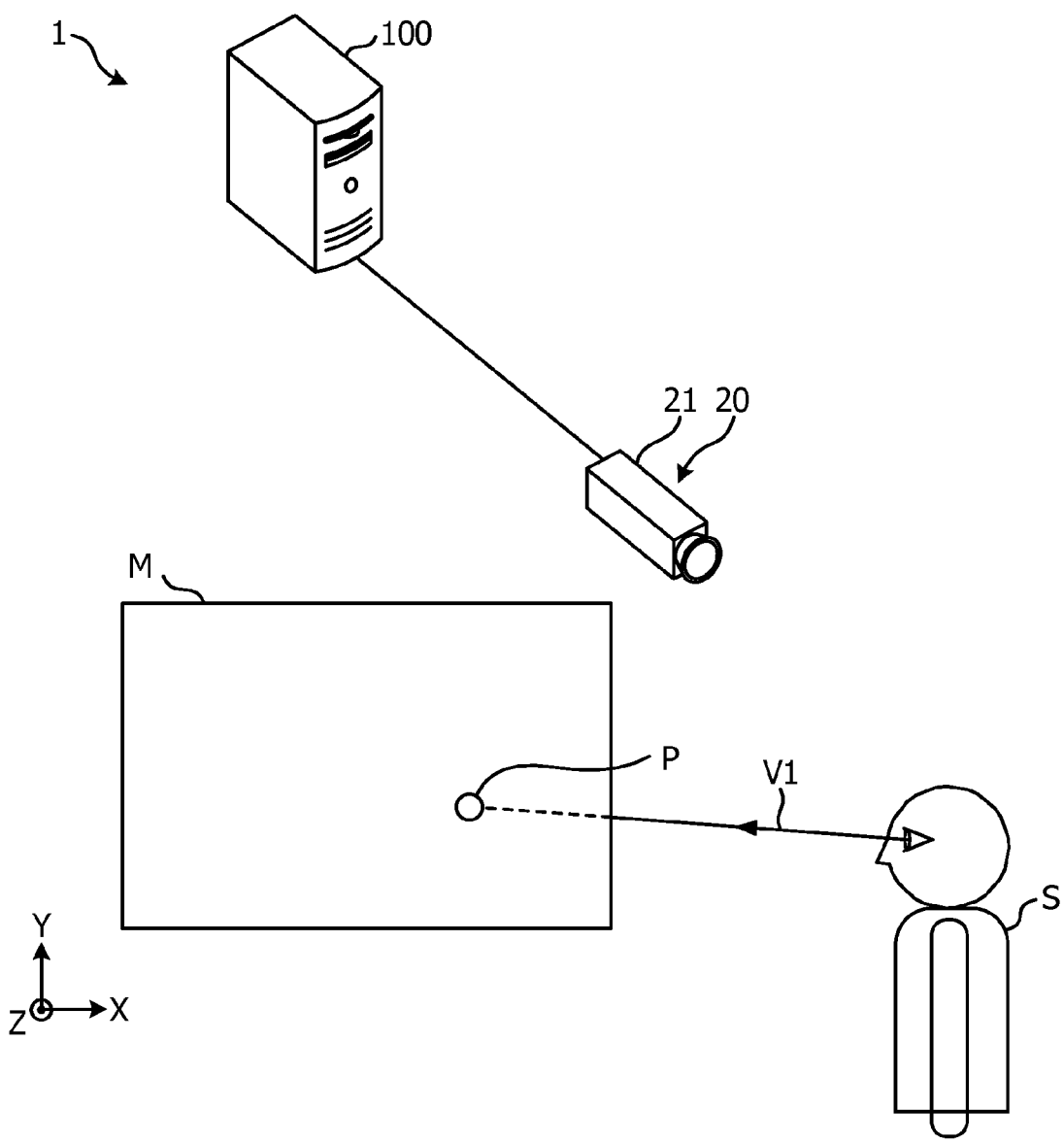
FIG. 1 is a diagram illustrating an example of a utilization probability calculation system to which a utilization probability calculation device is applied.

FIG. 1 is a diagram illustrating an example of a utilization probability calculation system 1 to which a utilization probability calculation device is applied.

The utilization probability calculation system 1 includes a gaze sensor 20 and a utilization probability calculation device 100. The utilization probability calculation device 100 is coupled to the gaze sensor 20 through a wire or wirelessly so as to communicate with the gaze sensor 20. A part or all of functions of the utilization probability calculation device 100 described later may be achieved by a processing device that may be built in the gaze sensor 20.

The gaze sensor 20 includes a camera 21. The gaze sensor 20 may include a plurality of cameras 21. In the following description, as an example, it is assumed that the gaze sensor 20 includes merely a single camera 21. When the gaze sensor 20 includes a plurality of cameras 21, aggregation of a plurality of images respectively captured by the plurality of cameras 21, that is, a single collective captured image may be utilized as "captured image" described below.

The camera 21 obtains a captured image of the eyes and the face of a target person S (example of a target person). In the following description, as an example, it is assumed that the camera 21 captures a scenery image including the face of the target person S. The camera 21 may include a certain type of an imaging element. For example, the camera 21 may be a relatively low-cost complementary metal-oxide-semiconductor (CMOS) camera.

Figure 2:
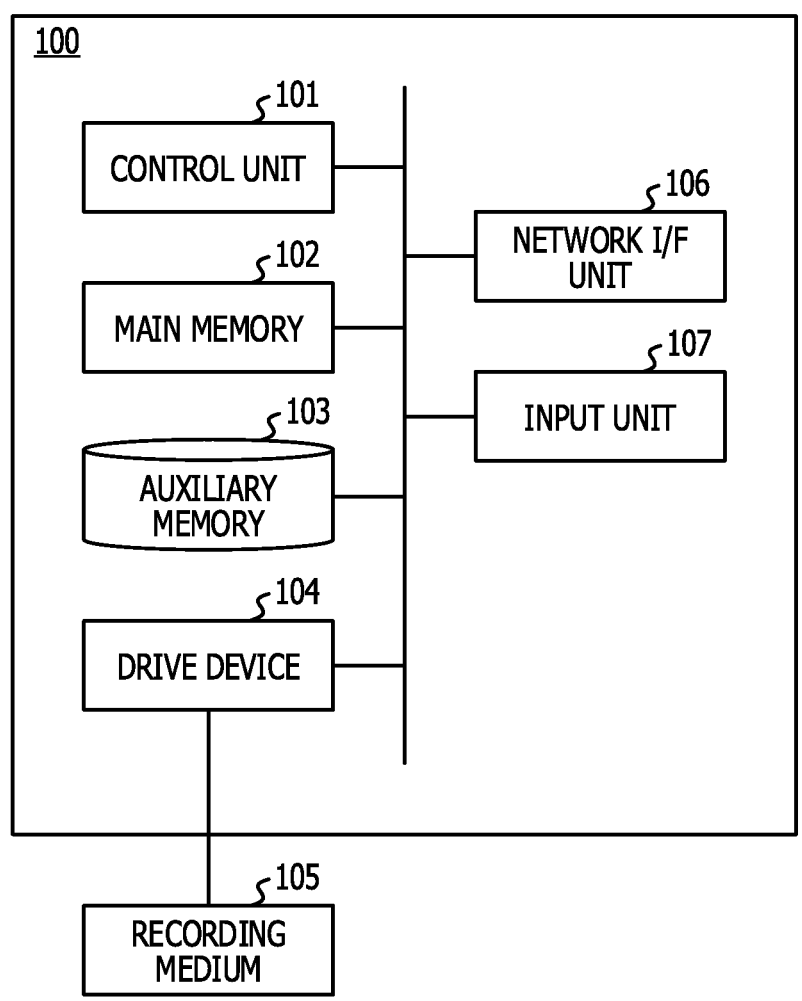
FIG. 2 is a diagram illustrating an example of a hardware configuration of the utilization probability calculation device.

FIG. 2 is a diagram illustrating an example of a hardware configuration of the utilization probability calculation device 100.

The utilization probability calculation device 100 may be, for example, achieved by a computer. In the example illustrated in FIG. 2, the utilization probability calculation device 100 includes a control unit 101, a main memory 102, an auxiliary memory 103, a drive device 104, a network I/F unit 106, and an input unit 107.

The control unit 101 is an arithmetic device that executes programs stored in the main memory 102 and the auxiliary memory 103, and receives data from the input unit 107 and the storage device, and outputs the data that has been subjected to calculation and processing, to the storage device or the like.

The main memory 102 is a read only memory (ROM), a random access memory (RAM), or the like. The main memory 102 is a storage device that stores or temporality stores data and programs such as application software and an operating system (OS) that is a basic software executed by the control unit 101.

The auxiliary memory 103 is a hard disk drive (HDD) or the like, and is a storage device that stores data related to the application software and the like.

The drive device 104 reads a program from a recording medium 105 such as a flexible disk, and installs the program to the storage device.

The recording medium 105 stores a certain program. Such a program stored in the recording medium 105 is installed to the utilization probability calculation device 100 through the drive device 104. The installed certain program is allowed to be executed by the utilization probability calculation device 100.

The network I/F unit 106 is an interface between the utilization probability calculation device 100 and a peripheral device having a communication function, which is coupled through a network established by a data transmission path such as a wired line and/or radio waves.

The input unit 107 includes a keyboard including cursor keys, numerical-input keys and various function keys, a mouse, and a touch pad.

In the example illustrated in FIG. 2, various processing and the like described below may be achieved by causing the utilization probability calculation device 100 to execute programs. In addition, the various processing and the like described below may also be executed by recording the programs to the recording medium 105, and causing the utilization probability calculation device 100 to read the programs that have been recorded to the recording medium 105. As the recording medium 105, various types of recording mediums may be used. For example, the recording medium 105 may be a recording medium to which information is optically, electrically, or magnetically recorded such as a compact disc read-only memory (CD-ROM), a flexible disk, or a magneto-optical disk, or a semiconductor memory to which information is electrically recorded such as a ROM, or a flash memory. The recording medium 105 does not include carrier waves.

Figure 3:
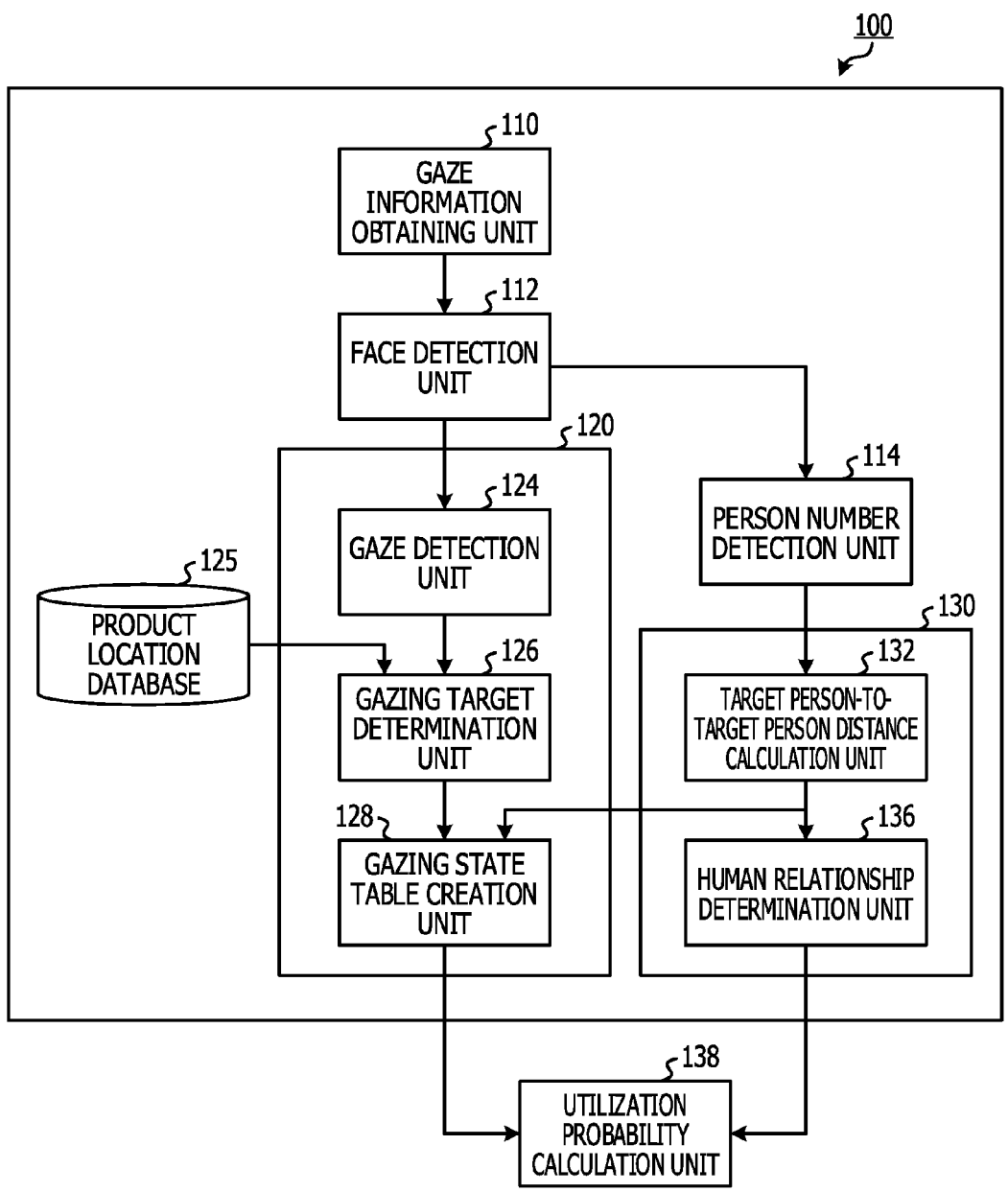
FIG. 3 is a functional block diagram of the utilization probability calculation device.

FIG. 3 is a functional block diagram of the utilization probability calculation device 100.

The utilization probability calculation device 100 calculates probability that a certain object is utilized by a person (hereinafter referred to as "utilization probability"). Here, the utilization by the person includes action for the utilization, for example, purchasing for the utilization by the person, borrowing for the utilization by the person (whether paid or free), handing over to a person for the utilization, in addition to the action of utilization as is. The object is a random object, and in the following description, as an example, it is assumed that the object is a product that is a purchasing target by the target person S. In addition, in the following description, as an example, the product is assumed as a certain product displayed in a shop. Thus, the target person S is a person who visits the shop (person who may utilize the product). In this case, the camera 21 of the gaze sensor 20 is provided so as to be allowed to image the face of the target person S who is gazing at the product.

The utilization probability calculation device 100 includes a gaze information obtaining unit 110, a face detection unit 112, a person number detection unit 114, a gaze state determination unit 120, a relationship determination unit 130, and a utilization probability calculation unit 140.

The gaze information obtaining unit 110 obtains gaze information from the gaze sensor 20. The gaze information may be an image that has been captured by the camera 21, or information on the line of sight, which is obtained based on the captured image by the camera 21 (for example, the gaze vector and the gaze position). Here, it is assumed that the gaze information obtaining unit 110 obtains the captured image by the camera 21. For example, the gaze information obtaining unit 110 obtains the captured image by the camera 21 for each certain frame rate.

The face detection unit 112 detects the face of the target person S, based on the captured image by the camera 21. A detection algorithm of the face of the target person S by the face detection unit 112 may be, for example, a high-precision algorithm such as a facial recognition technology used to identify an individual target person S, but may be a simple algorithm by which it is determined whether the captured image corresponds to a face. This is why a detection result of the face of the target person S by the face detection unit 112 is used to calculate the number of target persons S in the captured image, in the person number detection unit 114 described later.

The person number detection unit 114 calculates the number of target persons S in each of the captured images, based on the detection result of the face detection unit 112. For example, when two faces have been detected by the face detection unit 112, the person number detection unit 114 calculates the number of persons as "two persons".

The gaze state determination unit 120 includes a gaze detection unit 124, a gazing target determination unit 126, and a gazing state table creation unit 128.

The gaze detection unit 124 detects the line of sight of the target person S corresponding to the face that has been detected by the face detection unit 112. Here, the gaze detection unit 124 calculates the gaze position of the target person S on a virtual plane M. As illustrated in FIG. 1, the virtual plane M is, for example, a vertical plane including the position (coordinates) of the product. As illustrated in FIG. 1, the gaze position P is the position of a point at which a gaze vector V1 intersects the virtual plane M. In the following description, for convenience, as illustrated in FIG. 1, the XYZ axes are defined by setting the left end of the virtual plane M as the origin point, and it is assumed that the positive direction of the Z axis corresponds to the target person S side.

The gaze position calculation method is a certain method. For example, the gaze detection unit 124 calculates the gaze vector V1 of the target person S, based on the captured image by the camera 21. The calculation method of the gaze vector V1 of the target person S is a certain method. The calculation method of the gaze vector V1 of the target person S is, for example, a method discussed in Japanese Laid-open Patent Publication No. 2011-217764. In addition, the detection method of the gaze direction (gaze vector V1) may be a corneal reflection method by which the pupils and the corneal reflection are detected, and the gaze direction is calculated from the positional relationship between the pupils and the corneal reflection. In this case, the gaze sensor 20 includes a near-infrared light-emitting diode (LED). Such a method in which the near-infrared light by near-infrared LED is incident on the face of the target person S uses a fact that the position of the pupil is changed depending on the gaze direction, but the position of the corneal reflection is not affected by the gaze direction. When the near-infrared light by the near-infrared LED is incident on the face, the corneal reflection that is a reference point occurs in the eye, so that the measurement accuracy is improved as compared with the method in which the measurement is performed merely based on the camera. After that, the gaze detection unit 124 calculates the gaze position of the target person S, based on the detected gaze vector V1. For example, the gaze detection unit 124 calculates the gaze position of the target person S on the virtual plane M on which the product is located, based on the gaze vector V1 and a distance between the target person S and the product. The distance between the target person S and the product may be a measured value or a fixed value (assumed value). For example, the gazing target determination unit 126 may calculate the distance between the target person S and the product (hereinafter, also referred to as "product-to-target person distance"), based on a distance between the pupils of the target person S. However, the calculation method of the product-to-target person distance is a certain method, and for example, when the gaze sensor 20 obtains a distance image, the product-to-target person distance may be calculated based on the distance image. The calculated gaze position may be subjected to post-processing such as calibration.

The gazing target determination unit 126 identifies a product to which the target person S corresponding to the face that has been detected by the face detection unit 112 directs the line of sight, based on the detection result by the gaze detection unit 124 (hereinafter also referred to as "product that is a gazing target").

The identification method of the product that is the gazing target of the target person S is a certain method. For example, the gazing target determination unit 126 identifies the product that is the gazing target of the target person S, based on the gaze position that has been calculated by the gaze detection unit 124 and location information of the product, which is stored in a product location database 125.

Figure 5:
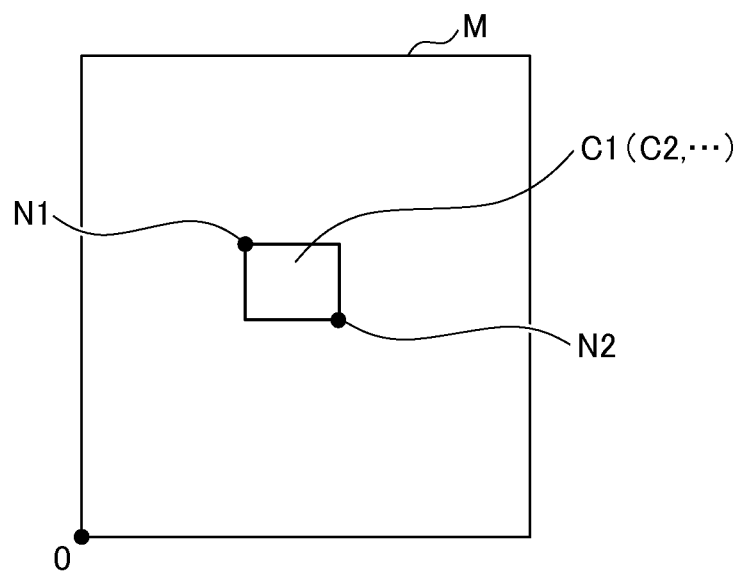
FIG. 5 is a second diagram illustrating the product location database.

The product location database 125 stores the location information indicating the location of the product that is the gazing target of the target person S. The location of the product, which is detected based on the location information, is a random location, and for example, may be the center position or the center of gravity of the product, the position of the high saliency portion of the product, or the like. FIGS. 4 and 5 are diagrams illustrating the product location database 125. In the example illustrated in FIG. 4, the XY coordinates of the upper left position N1 and the lower right position N2 of products C1, C2, . . . (see FIG. 5) are stored in the product location database 125. The product location database 125 may store information on the shape and the size of a product area, in addition to the location information of the product. The product area indicates an area in which the product is occupied on the virtual plane, but may be an area corresponding to the simple product outline. For example, the gazing target determination unit 126 may identify a product having location information that is the closest to the gaze position that has been calculated by the gaze detection unit 124, as the product that is the gazing target, or may identify a product corresponding to the product area including the gaze position that has been calculated by the gaze detection unit 124, as the product that is the gazing target. In addition, when there is merely a single product that is to be a gazing target, the gazing target determination unit 126 may automatically identify the product as the product that is the gazing target of the target person S.

The gazing state table creation unit 128 creates a gazing state table in which the determination results of the gazing target determination unit 126 are indicated in time series, for each target person. In this example, as an example, the gazing state table includes the time series of the calculation results of a target person-to-target person distance calculation unit 132, in addition to the time series of the determination results of the gazing target determination unit 126. The time series of the calculation results of the target person-to-target person distance calculation unit 132 may be synchronized with the time series of the determination results of the gazing target determination unit 126. FIGS. 6A and 6B are diagrams illustrating examples of gazing state tables when the two target persons S1 and S2 have been detected in a captured image. The target persons S1 and S2 are different persons. FIG. 6A illustrates an example of a gazing state table corresponding to the target person S1, and FIG. 6B illustrates an example of a gazing state table corresponding to the target person S2. The number in the field of the time period indicates a frame set for one second, as an example, and "1" indicates a frame set for the initial one second, and "2" indicates a frame set for the next one second. In the example illustrated in FIG. 6, it is indicated that the determination result of the gazing target determination unit 126, which indicates that both of the target persons S1 and S2 are gazing at the product C1, and the calculation result of the target person-to-target person distance calculation unit 132, which indicates that the distance between the target persons at that time is 50 cm, are obtained from the frames for the initial nine seconds. In addition, it is indicated that the determination result of the gazing target determination unit 126, which indicates that the both of the target persons S1 and S2 are gazing at the product C2, and the calculation result of the target person-to-target person distance calculation unit 132, which indicates that the distance between the target persons at that time is 80 cm, are obtained from the frames for the last one second.

The relationship determination unit 130 includes the target person-to-target person distance calculation unit 132 and a human relationship determination unit 136.

When a plurality of target persons S has been detected in a captured image at a certain time point, the target person-to-target person distance calculation unit 132 calculates a distance between the target persons. The distance between the target persons may be calculated by a certain method. For example, the distance between the target persons may be calculated based on a distance between the position of the eye of one of the target persons S and the position of the eye of the other target person S, a distance between the gravity points of the face areas of the target persons S, or the like.

When a plurality of target persons S has been detected in the captured image, the human relationship determination unit 136 determines whether there is a human relationship in which it is probable that the plurality of target persons S shares the gazing target. The human relationship in which it is probable that the plurality of target persons S shares the gazing target may be a relationship regarded as a group, and for example, may include at least one of a blood relation, a living relation, a friendship, and a lover. For example, the plurality of target persons S in the person-to-person relationship in which it is probable that the target persons share the gazing target may include "husband and wife", "parent and child", "couple", "person to be cared and caregiver", and "shop staff and customer". In the following description, the human relationship in which it is probable that the target persons share the gazing target is also simply referred to as "human relationship having high sharing probability".

For example, the human relationship determination unit 136 may determines whether the plurality of target persons S is in the human relationship having high sharing probability, based on whether the target persons S in the captured image is in a close relationship. For example, the human relationship determination unit 136 may determine whether the plurality of target persons S is in the human relationship having high sharing probability, based on a physical distance between the target persons S. Typically, there is a personal space as a space physically secured when a person is adjacent to a further person. When these persons are in a close relationship, it is known that such a personal space becomes relatively narrow as compared with a case in which these persons are not in the close relationship. Therefore, it may be determined whether these target persons S are in a human relationship having high sharing probability, from the distance between one target person S and the other target person S.

The utilization probability calculation unit 140 calculates the utilization probability for each target person S (example of a second index value) and the utilization probability for each group (example of a first index value). The utilization probability by a certain target person S indicates probability that a gazing target is utilized by the target person S. The utilization probability by a certain group indicates probability that the object is utilized by the group (utilization probability of the object by the plurality of target persons S who belong to the group). At the time of evaluation of the utilization probability, a single group may be identified as a single target person S. The utilization probability by a group is described later. In addition, the utilization probability by a plurality of target persons S indicates probability that an object is utilized by the plurality of target persons S. High utilization probability by the plurality of target persons S may mean that the number of objects utilized by the plurality of target persons S is large, in addition to high probability that the object is utilized by the plurality of target persons S.

The utilization probability of a certain product by a target person S may be a degree of interest for the product by the target person S (example of a second index value). That is, the utilization probability of a certain product by each target person S may indicate a degree of interest for the product by the target person S. The utilization probability of a certain product by a group may be a degree of interest for the product of the group, that is, may be a representative value of a degree of interest by each of the target persons S (example of a first index value).

For a plurality of target persons S that is not in a human relationship having high sharing probability, the utilization probability calculation unit 140 calculates the utilization probability for each of the target persons S, based on the determination result of the human relationship determination unit 136. Here, as an example, the utilization probability calculation unit 140 calculates the utilization probability for each of the target persons S, as a cumulative value of a time period in which the target person S is gazing at a product. In a further example, the utilization probability calculation unit 140 may calculate frequency in which each of the target persons S has gazed at the product (how many times the target person has gazed at the product), as the utilization probability for each of the target persons S, or may determine whether each of the target persons S has gazed at the product (binarization). The utilization probability calculation unit 140 calculates the utilization probability of each product by the target person S. For example, in the example illustrated in FIGS. 6A and 6B, the utilization probability calculation unit 140 calculates the utilization probability of the product C1 by the target person S1 as "9" because the target person S1 is gazing at the product C1 for nine seconds. In addition, the utilization probability calculation unit 140 calculates the utilization probability of the product C2 by the target person S1 as "1" because the target person S1 is gazing at the product C2 for one second. Similarly, the utilization probability calculation unit 140 calculates the utilization probability of the product C1 by the target person S2 as "9" because the target person S2 is gazing at the product C1 for nine seconds. In addition, the utilization probability calculation unit 140 calculates the utilization probability of the product C3 by the target person S2 as "1" because the target person S2 is gazing at the product C3 for one second. The calculation result for each of the target persons S, which is obtained as described above, may be stored as the individual table illustrated in FIG. 7.

On the other hand, the utilization probability calculation unit 140 regards a group of a plurality of target persons S that is in a human relationship having high sharing probability as a single target person, based on the determination result of the human relationship determination unit 136, and calculates the utilization probability by the group. Here, as an example, the utilization probability calculation unit 140 calculates the utilization probability by the group by appropriately correcting each of the cumulative values instead of simply combining the cumulative values of the time periods in which the respective target persons S that belong to the group have gazed at the product and by combining the corrected cumulative values. At that time, the utilization probability calculation unit 140 corrects the cumulative value so that the cumulative value is reduced. In addition, without the correction processing for the cumulative values, the cumulative values may be calculated so as to become smaller than a value obtained by combining the time periods in which each of the users S has gazed at the product. For example, the utilization probability calculation unit 140 calculates the utilization probability by the group, as the cumulative values of the time periods in which some users S having the certain number of persons that is smaller than the total number of a plurality of users S who belong to the group have gazed at the product. This is equivalent to a case in which the cumulative values of the time periods in which the other users S have gazed at the product are corrected to "0". Alternatively, the utilization probability calculation unit 140 may calculate the utilization probability by the group by performing weighting-averaging on the cumulative values of the time periods in which the users S who belong to the group, have gazed at the product. In addition, in these various calculation methods, merely time periods when a distance between the users is a certain threshold value Th1 (described later) or less may be accumulated.

The description is made above using the example in which the cumulative values of time periods in which the users have gazed at the product are used, but as described above, the determination may be made based on the number of persons who have gazed at the product or the number of times that the persons have gazed at the product.

When the determination is made based on the number of persons, for a plurality of users S that is not in a human relationship having high sharing probability, the utilization probability is calculated using the number of plurality of users S, and for the plurality of users S that is in the human relationship having high sharing probability, the utilization probability is calculated using the number of persons that is smaller than the total number of plurality of users S.

When the determined is made based on the number of times that the persons have gazed at the product, for a plurality of users S that is not in the human relationship having high sharing probability, the utilization probability is calculated using the number of times that the plurality of users S have gazed at the product, and for the plurality of users S that is in the human relationship having high sharing probability, the utilization probability is calculated using the number of times that is smaller than the total number of times that the plurality of users S have gazed at the product.

FIG. 8 is a diagram illustrating an example of a calculation result (group table) of the utilization probability by a group constituted by the two target persons S1 and S2 illustrated in FIGS. 6A and 6B. Here, it is assumed that the two target persons S1 and S2 are determined to be in a human relationship having high sharing probability, and the target persons S1 and S2 belong to a group G1. In FIG. 8, a group G2 is also illustrated in addition to the group G1. The utilization probability calculation unit 140 calculates the utilization probability by the group G1 for each product. For example, in the example illustrated in FIGS. 6A and 6B, both of the target persons S1 and S2 in the group G1 have gazed at the product C1 for nine seconds, so that the utilization probability calculation unit 140 calculates the utilization probability of the product C1 by the group G1 as "9". That is, the utilization probability calculation unit 140 calculates the utilization probability of the product C1 by the group G1, not as "18" obtained by combining the pieces of utilization probability of the two persons' portion, but as "9". In addition, merely the target person S1 in the group G1 has gazed at the product C2 for one second, so that the utilization probability calculation unit 140 calculates the utilization probability of the product C2 by the group G1 as "1". In addition, merely the target person S2 in the group G1 has gazed at the product C3 for one second, so that the utilization probability calculation unit 140 calculates the utilization probability of the product C3 by the group G1 as "1". The calculation results for each of the groups, obtained as described above, may be stored as the group table as illustrated in FIG. 8.

As described below, the utilization probability calculation unit 140 may calculate the utilization probability by determining the attribute of a product as well. This is described later in a second embodiment.

When a plurality of target persons S is in a human relationship having high sharing probability, the utilization probability by the plurality of target persons S may become smaller than the case in which the plurality of target persons S is not in the human relationship having high sharing probability. This is why there is probability that the plurality of target persons S utilizes a single product together when the plurality of target persons S is in the human relationship having high sharing probability. For example, when a product A is looked at by a person, and a product B is looked at by three persons, it may be regarded that the demand (utilization probability) for the product B is three times the demand for the product A when the determination is simply made merely based on the number of persons who are gazing at the product. However, when the three persons who are gazing at the product B are in a family relationship or the like, and the products A and B are products such as large-size refrigerators, one of which is sufficient for a family, the three persons who are in the family relation do not respectively purchase the three products B. Therefore, it is not regarded that the demand (utilization probability) for the product B is three times the demand for the product A. As described above, the utilization probability may not be calculated accurately when the determination is made merely based on the number of person who are gazing at the product.

Therefore, in the utilization probability calculation device 100 illustrated in FIG. 3, when the plurality of target persons S is in the person-to-person relationship having high sharing probability, the utilization probability by the plurality of target persons S is calculated as the utilization probability by the group G1, so that the calculation accuracy of the utilization probability by the plurality of target persons S may be improved. That is, in the utilization probability calculation device 100 illustrated in FIG. 3, when the plurality of target persons S is in the person-to-person relationship having high sharing probability, the utilization probability by the plurality of target persons S is calculated not by simply combining the pieces of utilization probability of the target persons S, but causing the utilization probability to have a value smaller than the combined value. As a result, the calculation accuracy of the utilization probability by the plurality of target persons S may be improved.

Further specifically, in the example illustrated in FIG. 8, the utilization probability calculation unit 140 calculates the utilization probability of the product C1 by the group G1, not as "18" obtained by combining the pieces of utilization probability of the two persons' portion, but as "9". The utilization probability by the group G1 is equivalent to the utilization probability by the plurality of the target persons S1 and S2. When the plurality of the target persons S1 and S2 is not in the human relationship having high sharing probability, the utilization probability by the plurality of the target persons S1 and S2 becomes "18" obtained by combining the pieces of utilization probability of the two persons' portion. As described above, in the utilization probability calculation device 100 illustrated in FIG. 3, the utilization probability by the plurality of target persons S may be calculated accurately depending on a human relationship between the plurality of the target persons S1 and S2.

Figure 9:
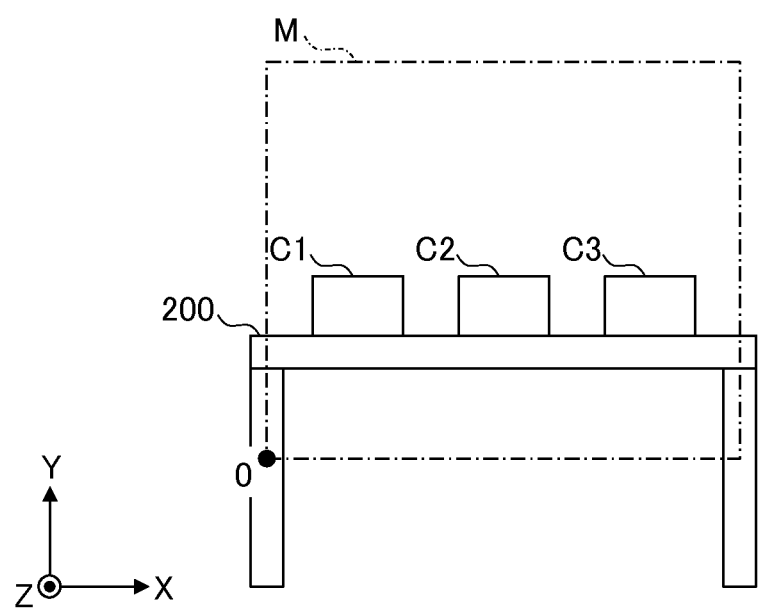
FIG. 9 is a diagram illustrating an example of a scene in which products are placed on a store shelf.

An operation of the utilization probability calculation device 100 according to an embodiment (first embodiment) is described below with reference to FIGS. 9 to 11. Here, it is assumed that three products C1, C2, and C3 are placed on a store shelf 200 (see FIG. 9). In this case, the camera 21 of the gaze sensor 20 (here, two or more cameras 21 may be also applied) is provided so as to image a target person S even when the target person S gazes at any one of the three products C1, C2, and C3. FIG. 9 is a diagram schematically illustrating a state in which the products C1, C2, and C3 are placed on the store shelf 200. In this case, the camera 21 (not illustrated) is provided, for example, in the vicinity of the product C2 located in the center of the products, and there is the gaze direction in the positive direction of the Z axis. In addition, it is assumed that the target person S (not illustrated) gazes at the products C1, C2, and C3 at the position on the side of the positive direction of the Z axis, for the products C1, C2, and C3. In the example illustrated in FIG. 9, the three products C1, C2, and C3 on the store shelf 200 are placed in the horizontal direction, but in the following description, the embodiment may also be applied to a state in which products having the certain quantity are provided on the store shelf 200 in a certain direction.

Figure 10:
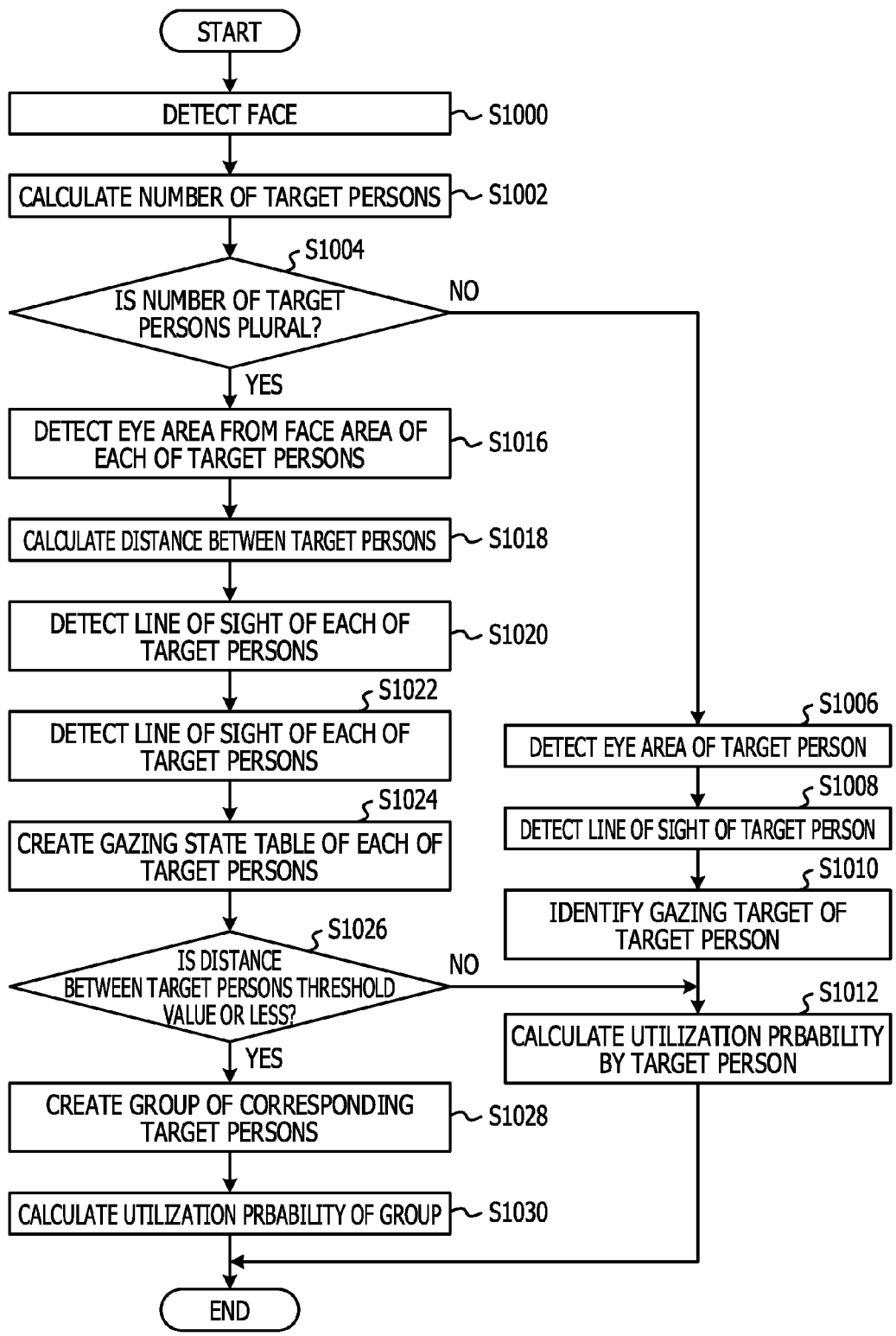
FIG. 10 is a flowchart illustrating an example of utilization probability calculation processing executed by the utilization probability calculation device.
Figure 11:
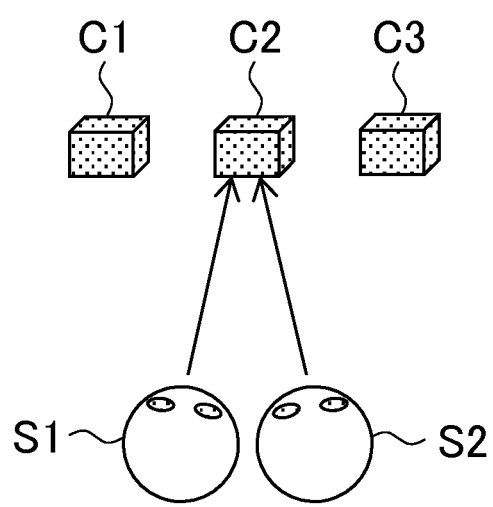
FIG. 11 is a diagram illustrating an example of a scene in which the grouped target persons gaze at a product.

FIG. 10 is a flowchart illustrating an example of utilization probability calculation processing executed by the utilization probability calculation device 100 according to the first embodiment. The processing illustrated in FIG. 10 may be executed each time the gaze information obtaining unit 110 obtains gaze information (captured images in this example) of a certain time period portion from the gaze sensor 20.

In Step S1000, the face detection unit 112 executes face detection processing, based on the captured image that has been obtained from the gaze sensor 20 by the gaze information obtaining unit 110.

In Step S1002, the person number detection unit 114 detects the number of persons included in the captured image, based on the face detection result.

In Step S1004, the person number detection unit 114 determines whether the number of target persons is plural (two or more). When the number of target persons is two or more, the flow proceeds to Step S1016, and otherwise (when the target person number is one), the flow proceeds to Step S1006.

In Step S1006, the gaze detection unit 124 assigns a target person identification (ID) to the single target person S who has been detected, and detects the eye area of the target person. Here, as an example, the single target person S who has been detected is referred to as "target person Sm". The eye area may be detected, for example, by pattern matching. The eye area may be detected at the time of face detection.

In Step S1008, the gaze detection unit 124 detects the gaze position of the target person Sm. The detection (calculation) method of the gaze position may be as described above.

In Step S1010, the gazing target determination unit 126 identifies a product that is the gazing target of the target person Sm. The identification method of the product that is the gazing target may be as described above. Here, it is assumed that the product Ct (products C1, C2, or C3) has been identified.

In Step S1012, the utilization probability calculation unit 140 calculates the utilization probability by the target person S corresponding to the product Ct (target person Sm or each of the target persons S1 and S2 when the determination result in Step S1026 is "NO"). The calculation method of the utilization probability by the target person S may be as described in the above calculation method of the utilization probability for each of the target persons. When the utilization probability by the target person S is calculated as described above, the utilization probability calculation unit 140 may create or update the individual table (FIG. 7).

In Step S1016, the gaze detection unit 124 assigns a target person ID to the two target persons S or more, which have been detected this time, and detects the eye area of each of the target persons. Here, as an example, it is assumed that the target persons S that have been detected are two persons, and the target persons S are referred to as "target persons S1 and S2". Even when three or more target persons S are detected, the following description is applied.

In Step S1018, the target person-to-target person distance calculation unit 132 calculates a distance between the target persons S1 and S2. The calculation method of the distance between the target persons may be as described above. The target person-to-target person distance calculation unit 132 may calculate the distance between the target persons for each captured image (time series) in which the target persons S1 and S2 are detected.

In Step S1020, the gaze detection unit 124 detects the gaze position of each of the target persons S1 and S2. The gaze position may be detected for each of the target persons S1 and S2. The detection (calculation) method of the gaze position may be as described above. The gaze detection unit 124 may calculate the gaze position for each of the captured images (time series), in which the target persons S1 and S2 are detected.

In Step S1022, the gazing target determination unit 126 identifies the product that is the gazing target of each of the target persons S1 and S2. The product that is the gazing target may be identified for each of the target persons S1 and S2. The identification method of the product that is the gazing target may be as described above. The gazing target determination unit 126 may identify the product that is the gazing target of each of the target persons S1 and S2, for each of the captured images (time series) in which the target persons S1 and S2 are detected. Here, it is assumed that an identical product Ct (products C1, C2, or C3) is identified as the product that is the gazing target of each of the target persons S1 and S2.

In Step S1024, the gazing state table creation unit 128 creates gazing state tables corresponding to the target persons S1 and S2, based on the results of Steps S1018 and S1022. The gazing state tables are as described above with reference to FIGS. 6A and 6B.

In Step S1026, the human relationship determination unit 136 determines whether a distance between the target persons S1 and S2 is a certain threshold value Th1 or less, based on the gazing state tables that have been obtained in Step S1024. The certain threshold value Th1 is a threshold value used to determine whether the target persons S1 and S2 are in a human relationship having high sharing probability, and this is why the human relationship having high sharing probability causes a physical shorter distance between the target persons. The certain threshold value Th1 is a random value, but for example, may be about 50 cm. The human relationship determination unit 136 may use an average value of the distances between the target persons S1 and S2 (average value of the distances between the target persons in the time periods). In addition, the human relationship determination unit 136 may determine whether the minimum value of the distance between the target persons is the certain threshold value Th1 or less, or whether the state in which the distance between the target persons is the certain threshold value Th1 or less has been continued for a certain time period or more. In addition, the human relationship determination unit 136 may merely use the distance between the target persons when both of the target persons S1 and S2 are gazing at an identical product. When the distance between the target persons is the certain threshold value Th1 or less, the flow proceeds to Step S1028, and otherwise, the flow proceeds to Step S1012. When the flow proceeds to Step S1012, it is determined that the two target persons S1 and S2 that have been detected are not in a human relationship having high sharing probability. In this case, the target persons S1 and S2 are not regarded as a group, and thus, in Step S1012, the utilization probability for each of the target persons is calculated. For example, the utilization probability calculation unit 140 calculates utilization probability of the product Ct by each of the target persons S1 and S2.

In Step S1028, the human relationship determination unit 136 regards the two target persons S1 and S2 that have been detected as a group, and assigns a group ID to the group. Here, as an example, the group of the target persons S1 and S2 that have been detected is referred to as "group G1".

When three or more target person S has been detected in Step S1004, the human relationship determination unit 136 may determine whether, for each of the target persons, a distance with a certain further target person is a certain threshold value Th1 or less, in Step S1026. Alternatively, the human relationship determination unit 136 may determine, for each of the target persons, whether a distance with each of the other target persons is the certain threshold value Th1 or less. As a result, in Step S1028, the human relationship determination unit 136 may regard merely some of the three or more persons S as a group. In this case, for the target person S that has been regarded as the group, the flow proceeds to Step S1030, and for the other target persons S, the flow proceeds to Step S1012.

In Step S1030, the utilization probability calculation unit 140 calculates the utilization probability of the product Ct by the group G1. The calculation method of the utilization probability by the group may be as described above. When the utilization probability by the group is calculated as described above, the utilization probability calculation unit 140 may create or update the group table (FIG. 8).

In the processing illustrated in FIG. 10, it is determined that the plurality of target persons S between which the distance is the certain threshold value Th1 or less is in a human relationship having high sharing probability, and the plurality of target persons S is grouped, and the utilization probability by the group is calculated. For example, the state as illustrated in FIG. 11, that is, the case is assumed in which the target persons S1 and S2 between which the distance is the certain threshold value Th1 or less are gazing at the identical product C2 (product Ct) at the same time. In FIG. 11, the line of sight of each of the target persons S1 and S2 is schematically illustrated by the arrow. In this case, the utilization probability by the plurality of target persons S1 and S2 is calculated as the utilization probability by the group. On the other hand, it is determined that a plurality of target persons S between which the distance is more than the certain threshold value Th1 is not in the person-to-person relationship having high sharing probability, and the utilization probability of each of the plurality of target persons S is calculated. As described above, in the processing illustrated in FIG. 10, the utilization probability is calculated differently depending on whether the plurality of target persons S is in the human relationship having high sharing probability, so that the highly accurate utilization probability may be calculated.

In the example illustrated in FIG. 10, the utilization probability is calculated differently depending on whether the plurality of target persons S is in the human relationship having high sharing probability, but the utilization probability may be calculated for each of the target persons S. In this case, when the plurality of target persons S is in the human relationship having high sharing probability, the plurality of target persons S is grouped, and the utilization probability by the group is calculated. In this case, the utilization probability by the group may be calculated so as to correct the utilization probability by each of the target persons S constituting the group. Such a correction method may be as described above.

An operation of a utilization probability calculation device 100 according to the further embodiment (second embodiment) is described with reference to FIGS. 12 to 14.

The second embodiment is different from the above-described first embodiment mainly in that a product attribute table is used. For example, in the second embodiment, the utilization probability calculation unit 140 determines the attribute (nature) of a product that is a gazing target in addition to the human relationship of a plurality of target persons S, and calculates the utilization probability. The attribute of the product may be related to, for example, whether the product is allowed to be shared between the plurality of target persons S.

FIG. 12 is a diagram illustrating an example of the product attribute table. In FIG. 12, for each of the products C1 and C2, and the like, the attribute is defined that indicates whether the product is allowed to be shared between a plurality of target persons S that is the human relationship having high sharing probability. For example, typically, a large-size product such as a refrigerator is allowed to be shared between the plurality of target persons S. In addition, for example, a product such as food and drink in a vending machine or the like is not allowed to be shared between the plurality of target persons S (or it is difficult to share the product between the plurality of target persons S). Whether the product is allowed to be shared between the plurality of target persons S that is in the human relationship having high sharing probability may be determined by a creator (designer) of the attribute table as appropriate.

Figure 13:
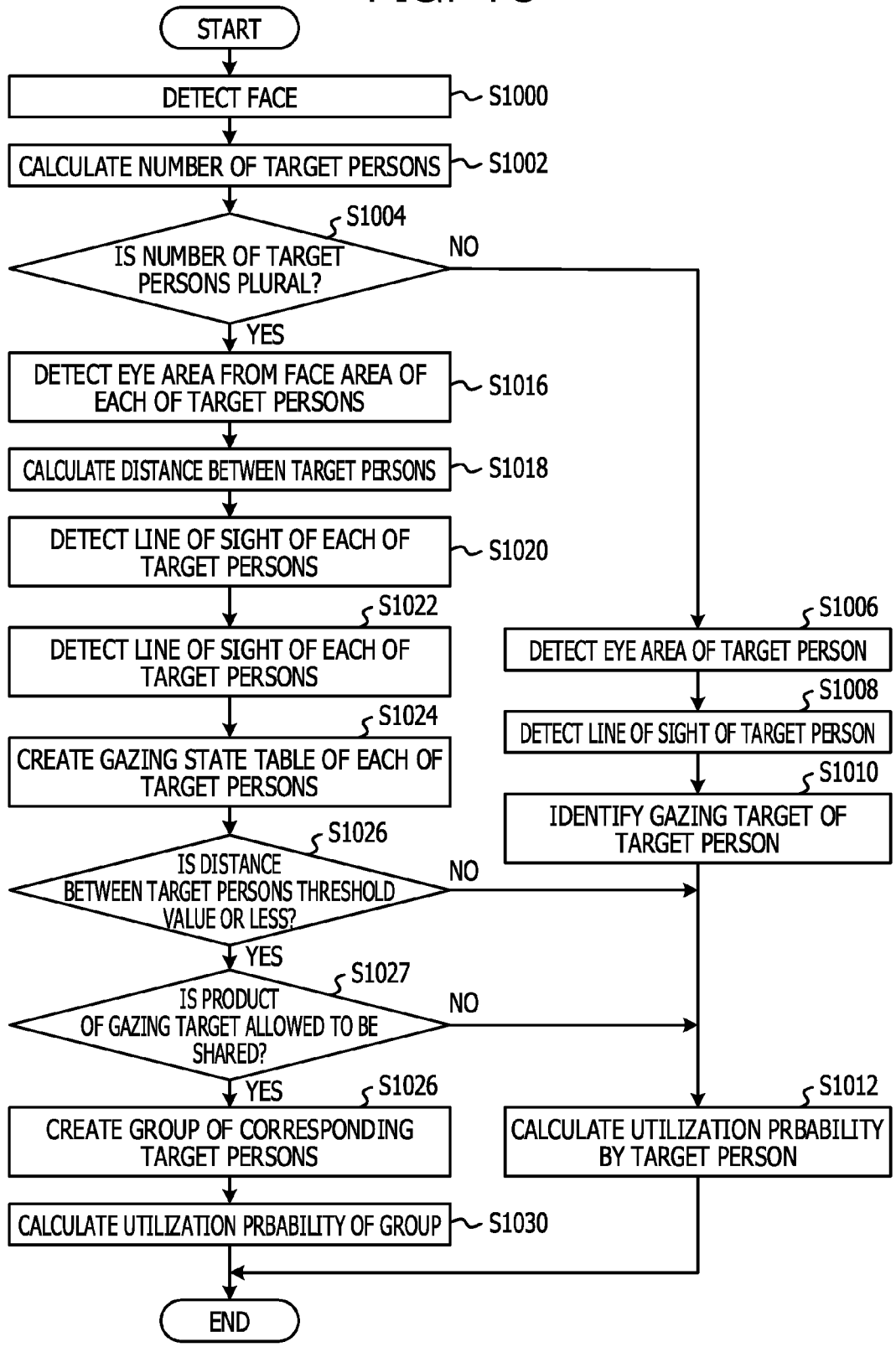
FIG. 13 is a flowchart illustrating an example of utilization probability calculation processing executed by a utilization probability calculation device according to a second embodiment.

FIG. 13 is a flowchart illustrating an example of utilization probability calculation processing executed by the utilization probability calculation device 100 according to the second embodiment. The processing illustrated in FIG. 13 may be executed each time the gaze information obtaining unit 110 obtains gaze information (captured images in this example) of a certain time period portion from the gaze sensor 20.

The processing illustrated in FIG. 13 is different from the processing illustrated in FIG. 10 mainly in that Step S1027 is added to the processing. The portion different from the processing in FIG. 10 is described below.

When determination result in the Step S1026 corresponds to "YES", the flow proceeds to Step S1027.

In Step S1027, the utilization probability calculation unit 140 determines whether the attribute of the product Ct that is the gazing target of the plurality of target persons S corresponds to a product to be shared, based on the gazing state table that has been obtained in Step S1024, with reference to the product attribute table (see FIG. 12). For example, in the example illustrated in FIG. 8, when the product Ct that is the gazing target is the product C1, and it is determined that the product is allowed to be shared, and when the product Ct that is the gazing target is the product C2 or C3, it is determined that the product is not allowed to be shared. When the attribute of the product Ct that is the gazing target corresponds to the product allowed to be shared, the flow proceeds to Step S1028, and otherwise, the flow proceeds to Step S1012. When the flow proceeds to Step S1012, the two target persons S1 and S2 may be in a human relationship having high sharing probability, but is not be grouped, and in Step S1012, the utilization probability by each of the target persons is calculated. For example, the utilization probability calculation unit 140 calculates the utilization probability of the product Ct by each of the target persons S1 and S2.

When there is a plurality of products Ct that is the gazing targets, in the utilization probability calculation unit 140, the flow may proceed to Step S1030 or Step S1012 depending on the attribute for each product. For example, in the examples illustrated in FIGS. 6A and 6B, the products that are the gazing targets of the target persons S1 and S2 are the three products C1, C2, and C3. In this case, it is understood from the product attribute table that the product C1 is allowed to be shared (see FIG. 12), so that the target persons S1 and S2 are regarded as a group G1, and the utilization probability by the group is calculated (Step S1030). On the other hand, it is understood from the product attribute table that the products C2 and C3 are not allowed to be shared (see FIG. 12), so that the utilization probability by each of the target persons S1 and S2 is calculated (Step S1012). In this case, based on each of the calculation results of the utilization probability, a table as illustrated in FIG. 14 may be generated so as to combine the individual table and the group table.

As described above, in the case in which a plurality of target persons S is in a human relationship having high sharing probability, the utilization probability by the plurality of target persons S tends to become small as compared with the case in which the plurality of target persons S is not in the human relationship having high sharing probability. However, such a tendency depends on the attribute of the product. For example, as described above, in a case in which a product is allowed to be shared, when a plurality of target persons S is in a human relationship having high sharing probability, the utilization probability by the plurality of target persons S tends to become small as compared with the case in which the plurality of target persons S is not in the human relationship having high sharing probability, but in the case of a product not allowed to be shared, such a tendency does not appear. This is why it is probable that the product not allowed to be shared is utilized by each of the plurality of target persons S that is in the human relationship having high sharing probability. For example, in a case in which a product A is being looked at by three persons who are in a human relationship having high sharing probability, when the product A is a product such as a large-size refrigerator, one of which is sufficient for one family, the three persons of the family member may not respectively purchase the three products A. On the other hand, in a case in which a product C is being looked at by three persons who are in a human relationship having high sharing probability, when the product C is a product such as a mobile phone used individually, probability that the three persons of the family member purchase merely the single product C is small. As described above, when the determination result of the human relationship having high sharing probability is merely used, it may be difficult to calculate the utilization probability accurately.

Therefore, in the processing illustrated in FIG. 13, when a plurality of target persons S is in a human relationship having high sharing probability, and a product that is the gazing target is allowed to be shared, the utilization probability calculation unit 140 calculates the utilization probability by the plurality of target persons S, as the utilization probability by the group G1, for the product. In addition, even in the case in which the plurality of target persons S is in the human relationship having high sharing probability, when the product that is the gazing target is not allowed to be shared, the utilization probability calculation unit 140 calculates the utilization probability of the product by each of the target persons S. As a result, calculation accuracy of the utilization probability by the plurality of target persons S and the utilization probability by each of the target persons S may be improved. As described above, in the processing illustrated in FIG. 13, when the utilization probability by the plurality of target persons S is calculated, the attribute of the product that is the gazing target of the plurality of target persons S is determined in addition to the human relationship between the plurality of target persons S, so that calculation accuracy of the utilization probability of each of the products may be improved.

An operation of a utilization probability calculation device 100 according to a further embodiment (third embodiment) is described with reference to FIGS. 15 to 18.

The third embodiment is different from the above-described first embodiment mainly in that a method of determining whether a plurality of target persons S is in a human relationship having high sharing probability (group).

Figure 15:
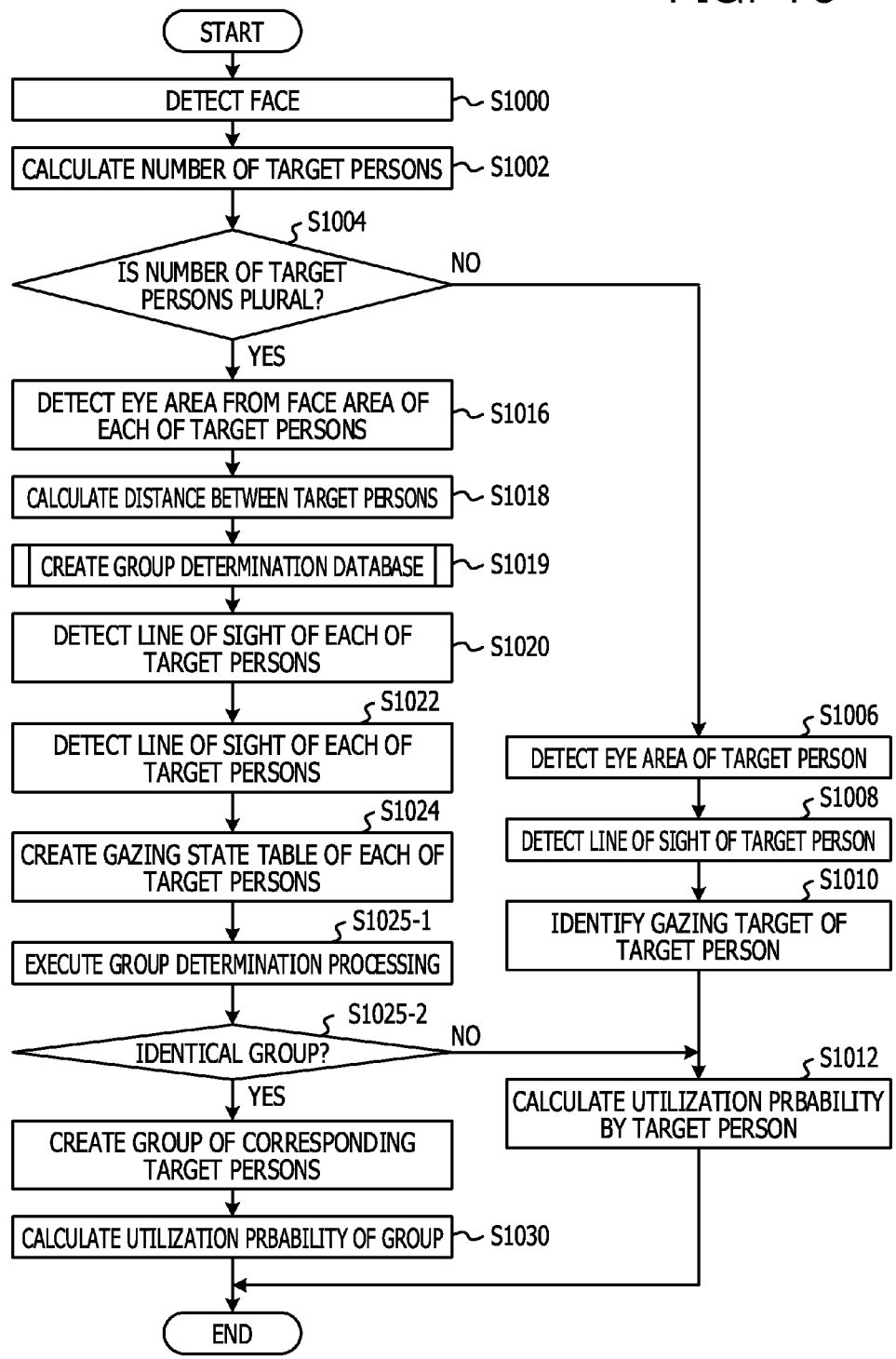
FIG. 15 is a flowchart illustrating an example of utilization probability calculation processing executed by a utilization probability calculation device according to a third embodiment.

FIG. 15 is a flowchart illustrating an example of utilization probability calculation processing executed by the utilization probability calculation device 100 according to the third embodiment. The processing illustrated in FIG. 15 may be executed each time the gaze information obtaining unit 110 obtains gaze information (captured images in this example) of a certain time period portion from the gaze sensor 20.

The processing illustrated in FIG. 15 is different from the processing illustrated in FIG. 10 mainly in that Steps S1019, S1025-1, and S1025-2 are added to the processing. The portion different from the processing in FIG. 10 is described below.

In Step S1019, the human relationship determination unit 136 generates a group determination database. The generation processing of the group determination database is described later with reference to FIG. 16.

In Step S1025-1, the human relationship determination unit 136 executes group determination processing, with reference to the group determination database that has been generated in Step S1019. The group determination processing is described later with reference to FIGS. 17A and 17B.

In Step S1025-2, the human relationship determination unit 136 determines whether the target persons S1 and S2 are grouped, based on the result of the group determination processing of Step S1025-1. When it is determined that the target persons S1 and S2 are grouped, the flow proceeds to Step S1028, and otherwise, the flow proceeds to Step S1012.

Figure 16:
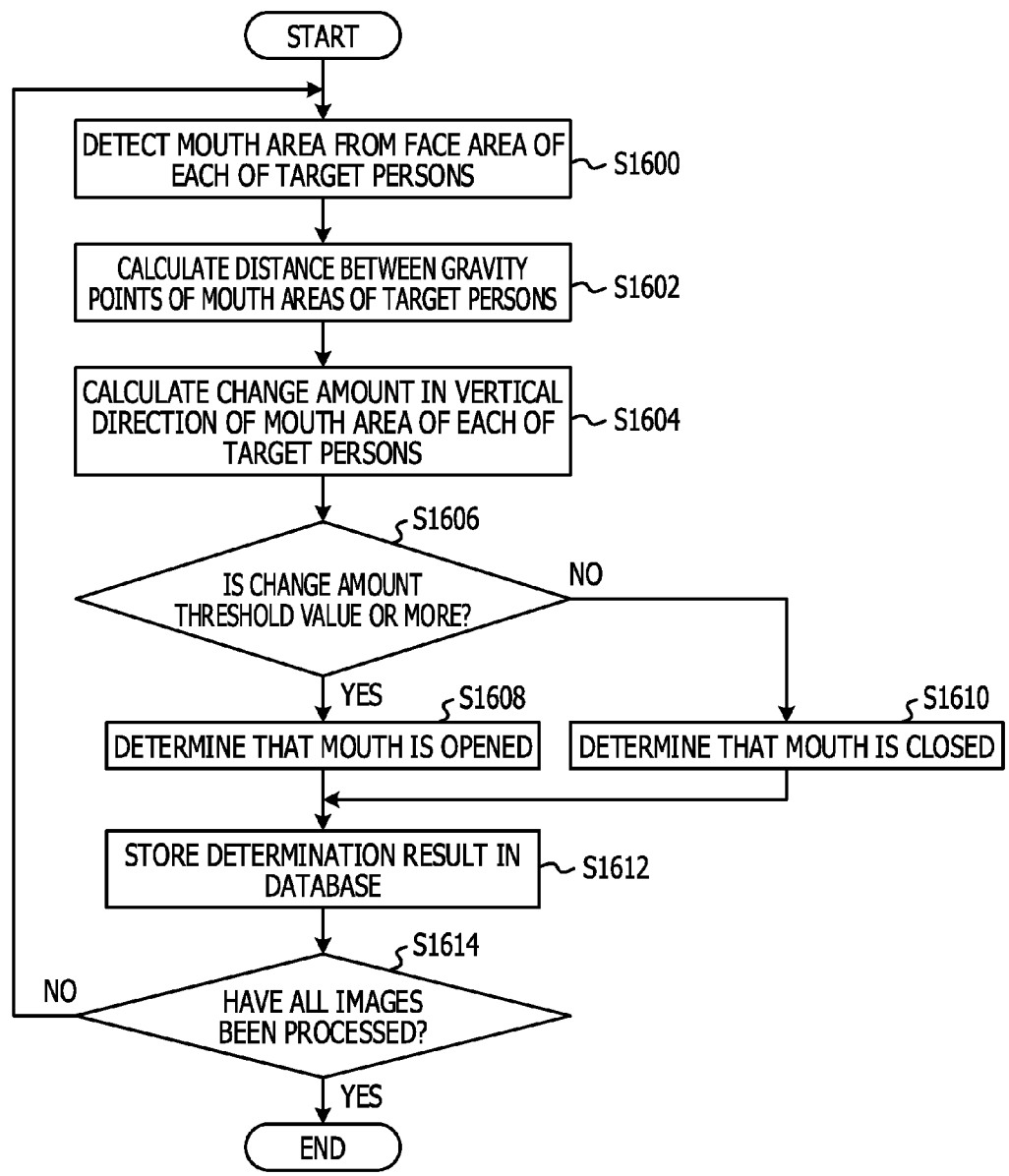
FIG. 16 is a flowchart illustrating an example of generation processing of group determination databases.

FIG. 16 is a flowchart illustrating an example of the generation processing of a group determination database. The processing illustrated in FIG. 16 may be executed for each of the images of a certain time period portion, which have been captured in chronological order from the gaze sensor 20 by the gaze information obtaining unit 110, or may be executed for each set of captured images having the certain quantity (for example, a frame set for one second) in chronological order.

In Step S1600, the human relationship determination unit 136 detects a mouth area from the face area of each of the target persons S1 and S2. Then detection method of the mouth area is a certain method, and for example, pattern matching may be used for the detection method.

In Step S1602, the human relationship determination unit 136 calculates a distance between the gravity points of the mouth areas of the target persons S1 and S2.

In Step S1604, the human relationship determination unit 136 calculates a change amount of the mouth area in the vertical direction, for each of the target persons S1 and S2. The change amount may be a change amount or the like from before each certain frame. The change amount of the mouth area in the vertical direction may be calculated as a change amount of the width of the mouth area in the vertical direction.

In Step S1606, the human relationship determination unit 136 determines whether the change amount of the mouth area in the vertical direction, which has been obtained in Step S1604, is a certain threshold value Th2 or more, for each of the target persons S1 and S2. When the change amount is the certain threshold value Th2 or more, the flow proceeds to Step S1608, and otherwise, the flow proceeds to Step S1610. When the determination result is different depending on each of the target persons S1 and S2, the flow may proceed to a step different depending on each of the target persons S1 and S2.

In Step S1608, the human relationship determination unit 136 determines that the mouth is opened.

In Step S1610, the human relationship determination unit 136 determines that the mouth is closed.

In Step S1612, the human relationship determination unit 136 stores the determination result of the captured image that has been processed (determination result indicating whether the mouth is opened) in a database.

In Step S1614, the human relationship determination unit 136 determines whether the determination processing has been completed for all images of a certain time period portion, which have been captured from the gaze sensor 20 by the gaze information obtaining unit 110. When the determination processing has been completed for all of the captured images, the processing ends, and otherwise, the flow returns to Step S1600, and the same processing is executed for a new captured image.

FIGS. 17A and 17B are diagrams illustrating examples of databases generated by the generation processing of the group determination database illustrated in FIG. 16. FIG. 17A illustrates an example of a database corresponding to the target person S1, and FIG. 17B illustrates a database corresponding to the target person S2. The number of the field of the time period indicates a frame set for one second, as an example, and "1" indicates a frame set for the initial one second, and "2" indicates a frame set for the next one second. In the example illustrated in FIGS. 17A and 17B, as the time period, the results of the generation processing of the group determination database for captured images for ten seconds are indicated. In the example illustrated in FIGS. 17A and 17B, the calculation result (distance) of a distance between the gravity points of the mouth areas of the target persons S1 and S2 is stored in addition to the determination results indicating whether the mouth is opened (state of the mouth).

Figure 18:
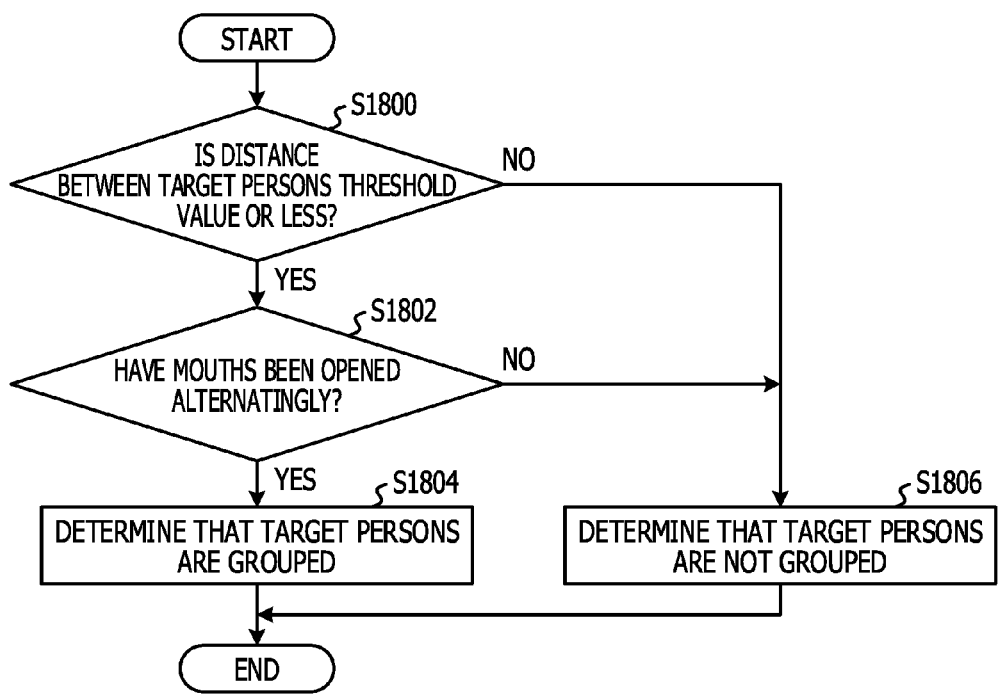
FIG. 18 is a flowchart illustrating an example of group determination processing.

FIG. 18 is a flowchart illustrating an example of the group determination processing.

In Step S1800, the human relationship determination unit 136 determines whether a distance between the target persons S1 and S2 is a certain threshold value Th1 or less, based on the gazing state table that has been obtained in Step S1024. Such a determination method may be similar to the above-described determination method in Step S1026. The human relationship determination unit 136 may determine whether the distance between the target persons is the certain threshold value Th1 or less, based on the processing result illustrated in FIG. 16 (distance between the gravity points of the mouth areas of the target persons S1 and S2), instead of or in addition to the gazing state table that has been obtained in Step S1024. When the distance between the target persons S1 and S2 is the certain threshold value Th1 or less, the flow proceeds to Step S1802, and otherwise, the flow proceeds to Step S1806.

In Step S1802, the human relationship determination unit 136 determines whether the target persons S1 and S2 have opened the mouths alternatingly, with reference to the group determination database (FIGS. 17A and 17B) obtained by the processing illustrated in FIG. 16. In the examples illustrated in FIGS. 17A and 17B, the determination results of the frame sets from the time periods "2" to "5" indicate that the target persons S1 and S2 have opened the mouths alternatingly. In this case, the human relationship determination unit 136 may determine that the target persons S1 and S2 have opened the mouths alternatingly. When the target persons S1 and S2 have opened the mouths alternatingly, the flow proceeds to Step S1804, and otherwise, the flow proceeds to Step S1806.

In Step S1804, the human relationship determination unit 136 determines that the target persons S1 and S2 are grouped. When such a determination result is obtained, the determination result in Step S1025-2 of FIG. 15 corresponds to "YES".

In Step S1806, the human relationship determination unit 136 determines that the target persons S1 and S2 are not grouped. When such a determination result is obtained, the determination result in Step S1025-2 of FIG. 15 corresponds to "NO".

In the processing illustrated in FIG. 15 and the like, it is determined whether the target persons S1 and S2 are in a human relationship having high sharing probability, based on the distance between the target persons and the movement of the mouths of the target persons S1 and S2 (opened/closed state). For example, the human relationship determination unit 136 determines that the target persons S1 and S2 are in a human relationship having high sharing probability when the distance between the target persons is the certain threshold value Th1 or less, and the target persons S1 and S2 have opened the mouths alternatingly. As a result, whether the target persons S1 and S2 are in the human relationship having high sharing probability may be accurately determined. Here, when the target persons S1 and S2 are in a close relationship, there is a case in which the target persons S1 and S2 may have a conversation while gazing at an identical product, but when the target persons S1 and S2 are not in a close relationship, the target persons S1 and S2 rarely have a conversation. Thus, a human relationship between the target persons S1 and S2 may be accurately determined by determining whether the target persons S1 and S2 have opened the mouths alternatingly, that is, whether the target persons S1 and S2 have had a conversation.

In the processing illustrated in FIG. 18, whether the target persons S1 and S2 are in a human relationship having high sharing probability is determined based on the distance between the target persons and the movement of the mouths of the target persons S1 and S2, but may be determined merely based on the movement of the mouths of the target persons S1 and S2.

The third embodiment may be combined with the above-described second embodiment. For example, the determination processing in Step S1027 may be added to the processing of FIG. 15.

The embodiments are described above in detail, but the technology discussed herein is not limited to the specific embodiments, and various variations and modifications may be performed within the range of claims. In addition, all or some of the configuration elements of the above-described embodiments may be combined with each other.

For example, in each of the above-described embodiments, the human relationship determination unit 136 determines whether the target persons S1 and S2 are in a human relationship having high sharing probability, based on the distance between the target persons and/or the movement of the mouths of the target persons S1 and S2, but the embodiment is not limited to such an example. For example, the human relationship determination unit 136 may determine that the target persons S1 and S2 are in the human relationship having high sharing probability when the target persons S1 and S2 are looking at each other's faces without gazing at an identical product, or when the target persons S1 and S2 are shaking their hands.

In addition, in each of the above-described embodiments, as illustrated in FIGS. 6A and 6B, the gazing state table includes the time series of the calculation results of the target person-to-target person distance calculation unit 132, in addition to the time series of the determination results of the gazing target determination unit 126, but the time series of the calculation result of the target person-to-target person distance calculation unit 132 may be omitted. In addition, when the utilization probability calculation unit 140 calculates the utilization probability by each of the target persons S, based on whether the target person S has gazed at a product, the gazing state table may store a value for each target person S and a value for each product. For example, as illustrated in FIG. 19, when the gazing state table indicates that a certain target person S1 has gazed at a product C1, the gazing state table may have a value "1", and when the gazing state table indicates that the target person S1 has not gazed at a certain product C3, the gazing state table may have a value "0". Such a gazing state table indicates the utilization probability by each of the target persons S. Thus, in such a configuration, the gazing state table creation unit 128 may achieve a part of the function of the utilization probability calculation unit 140 (calculation function of the utilization probability by each of the target persons S).

In addition, in each of the above-described embodiments, the utilization probability calculation unit 140 may further totalize the pieces of utilization probability of the target persons and/or the group, for each of the products, and obtain the total value of the pieces of utilization probability, for each of the products (see "total" in FIGS. 7 and 8). At that time, as illustrated in FIGS. 7 and 8, the utilization probability calculation unit 140 may obtain the total value of the individual table and the total value of the group table separately. Alternatively, the utilization probability calculation unit 140 may obtain a total value obtained by combining the total value of the individual table and the total value of the group table, for each of the products. When the utilization probability calculation unit 140 calculates the utilization probability by each of the target persons S, based on whether the target person S has gazed at a product (for example"1" is obtained when the product has been looked at, and "0" is obtained when the product has not being looked at), the total value corresponds to the number of target persons who has gazed at the product. Similarly, the utilization probability calculation unit 140 calculates the utilization probability by the group, based on whether a certain target person S (or target persons S having the certain number or more) of each of the groups has gazed the product, the total value corresponds to the number of groups that have gazed at the product.

In addition, in the processing illustrated in FIG. 10 and the like, the utilization probability calculation unit 140 calculates the utilization probability by the group, for the plurality of target persons that is in the human relationship having high sharing probability, instead of calculating the utilization probability by each of the target persons, but the embodiment is not limited to such an example. For example, the utilization probability calculation unit 140 may calculate the utilization probability by each of the plurality of target persons that is in the human relationship having high sharing probability, in addition to calculating the utilization probability by the group. In this case, when the utilization probability calculation unit 140 calculates the utilization probability of a certain product by the group, the utilization probability calculation unit 140 calculates the utilization probability of the product by each of the target persons that belong to the group. Therefore, the utilization probability calculation unit 140 calculates the utilization probability by each of the target persons and calculates the utilization probability by the group regardless of whether the targets are grouped.

In addition, in the processing illustrated in FIG. 10 and the like, the utilization probability calculation unit 140 calculates the utilization probability by the group including the plurality of target persons that is in the human relationship having high sharing probability, instead of calculation the utilization probability by each of the target persons, but the embodiment is not limited to such an example. For example, the utilization probability calculation unit 140 may not calculate the utilization probability by the group. Hereinafter, such a modification is referred to as "modification 1". In such a modification 1, the utilization probability calculation unit 140 may calculate (or correct) the utilization probability by each of the plurality of target persons that is the human relationship having high sharing probability so as to cause the utilization probability to become low. For example, the utilization probability calculation unit 140 may calculate the pieces of utilization probability of the target persons that belong to the group so as to cause the utilization probability to become low across the board, or may correct, at "0", the pieces of utilization probability by target persons other than a certain target person from among the target persons that belong to the group. In such a modification 1, for a certain product, aggregation of the pieces of utilization probability by the plurality of target persons S that belong to the certain group (example of a first index value) indicates probability that the product is utilized by the target persons S that belong to the identical group. For example, probability that the certain product is utilized by the plurality of target persons S who belongs to the certain group may be determined, based on a value obtained by combining the pieces of utilization probability of the target persons S that belong to the identical group.

In addition, in the processing illustrated in FIG. 13, the utilization probability calculation unit 140 calculates the utilization probability by each of the target persons, or the utilization probability by the group, depending on whether a product looked at by the plurality of target persons that is in the human relationship having high sharing probability is allowed to be shared, but the embodiment is not limited to such an example. When the product looked at by the plurality of target persons that is in the human relationship having high sharing probability is allowed to be shared, the utilization probability calculation unit 140 may calculate the utilization probability by each of the target persons in addition to calculating the utilization probability by the group. Alternatively, when the product looked at by the plurality of target persons that is in the human relationship having high sharing probability is allowed to be shared, the utilization probability calculation unit 140 may calculate the utilization probability by each of the target persons instead of calculating the utilization probability by the group. Hereinafter, such a modification is referred to as "modification 2". In such a modification 2, when the product looked at by the plurality of target persons that is in the human relationship having high sharing probability is allowed to be shared, the utilization probability calculation unit 140 may calculate (or correct) the utilization probability by each of the target persons so as to cause the utilization probability to become low as compared with a case in which the product is not allowed to be shared. For example, for the product allowed to be shared, the utilization probability calculation unit 140 may calculates the utilization probability by each of target persons that belong to the group so as to cause the utilization probability to become low across the board, or may correct, at "0", the utilization probability by target persons other than a certain one target person, from among the target persons that belong to the group. In such a modification 2, for the certain product allowed to be shared, aggregation of the pieces of utilization probability by the target persons S that belong to the certain group (example of a first index value) indicates probability that the product is utilized by the plurality of target persons S that belong to the identical group. For example, probability that the certain product allowed to be shared is utilized by the plurality of target persons S that belong to the certain group is determined, based on a combined value of the pieces of utilization probability of the target persons S that belong to the identical group.

In addition, in the processing illustrated in FIG. 13, when the plurality of target persons is in the human relationship having high sharing probability, and the product looked at by the plurality of target persons is allowed to be shared, the utilization probability calculation unit 140 calculates the utilization probability by each of the target persons, but the embodiment is not limited to such an example. For example, when the product is allowed to be shared, the utilization probability calculation unit 140 may calculate the utilization probability by each of the target persons without determining whether the target persons are in the human relationship having high sharing probability.

In addition, the product attribute table illustrated in FIG. 12 indicates whether the product is allowed to be shared, but may be set based on a further point of view. For example, the product attribute table may indicate whether the utilization probability of the product is calculated for each target person or each group. Such setting may be achieved in a desired manner by a designer.

In addition, in each of the above-described embodiments, when there is a short time period in which the line of sight of a certain target person is not detected, the utilization probability calculation unit 140 may calculate the utilization probability of the target person by assuming that the target person is gazing at the product that is the gazing target that is the same as a further target person that belongs to a group including the target person. As a result, even when the line of sight is not detected instantaneously due to blink or the like, the utilization probability may be accurately calculated.

In addition, in the above-described description, the object that is the gazing target of the target person S is the product displayed on the store shelf, but the size, the shape, and the like, of the product is random, and the display method of the product is also a random method. In addition, the location of the product may be traced.

In addition, in the above-described description, the virtual plane M includes the position (coordinates) of the object that is the gazing target of the target person S, but the virtual plane M may not include the position (Z coordinate) of the product based on the product location database 125. For example, the virtual plane M may be set so as to include a position obtained by offsetting the position (Z coordinate) of the product based on the product location database 125, by a specific value, in the Z axis positive direction. The specific value may be half of the length in the Z direction of the product.

In addition, in the above-described description, the virtual plane M is the vertical plane, but may be tilted for the vertical plane. In addition, a target that has been looked at by a user may be identified from three-dimensional location information of the gazing target, instead of the virtual plane.

In addition, in the above-described description, the object that is the gazing target of the target person S is a product, but may be an object other than the product (object that is not a commerce target). For example, the object that is the gazing target of the target person S may be a poster, an advertisement, a painting, a sculpture, an image, a building, a book, a plant, an animal, a product sample, or the like. In addition, the gazing target of the target person S may be a visible intangible object such as a content displayed on a screen such as a display, a mobile terminal, or a wearable terminal. For example, the object that is the gazing target of the target person S may be a screen area on a display device (digital signage) on which a content for advertisement (including object such as a product) is displayed or provided.

In addition, in each of the above-described embodiments, the gaze detection unit 124 calculates (identifies) the gaze position from the gaze vector, but the gaze position may be obtained by a certain method, and the processing in which the gaze position is calculated from the gaze vector may be an example of a method in which the gaze position is obtained. For example, the gaze detection unit 124 may calculate the gaze position by pattern matching without through the gaze vector. In addition, instead of the image processing, the gaze position may be obtained based on an ocular potential or the like. In addition, for example, when a target is large or when a target is located far away from the gaze sensor 20, the face orientation or the like may be regarded as the gaze direction.

In addition, in each of the above-described embodiments, the utilization probability calculation processing or the like may be executed by the utilization probability calculation device 100 in real-time.

In addition, in each of the above-described embodiments, the gaze sensor 20 is an installation-type gaze sensor, but may be a wearable gaze sensor attached to the target person S. In this case, it may be assumed that the wearable gaze sensor transmits location information with gaze information, to the utilization probability calculation device 100. The location information may be obtained by a global positioning system (GPS) receiver coupled to or built in the wearable gaze sensor. In this case, the utilization probability calculation device 100 may use the location information of each of the target persons S, which is obtained from the wearable gaze sensor to calculate a distance between the target persons. In addition, it may be assumed that the wearable gaze sensor transmits a specific ID to the utilization probability calculation device 100. In this case, the utilization probability calculation device 100 may determine a human relationship between the target persons, based on registration information of the target persons respectively associated with IDs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calculation device comprising:
   a memory; and
   a processor coupled to the memory and configured to:
   identify a first person in a plurality of images captured in time series respectively,
   obtain gaze information indicating a direction of a line of sight of the person, the gaze information being obtained by calculating a gaze vector of the person and calculating a gaze position of the person based on the calculated gaze vector,
   identify at least one of a time period in which the person directs the line of sight to a certain object and a number of times that the person directs the line of sight to the certain object, based on the gaze information and a position at which the certain object is placed,
   determine a distance between the first person and one or more second persons who are identified in at least one image from among the plurality of images, and determine whether there is a high probability that the first person and the one or more second persons have a human relationship based on the distance between the first person and the one or more second persons, and
   calculate an index value indicating probability that the certain object is utilized, based on whether there is a high probability that the first person and the one or more second persons have a human relationship, and at least one of the time period and the number of times.

2. The calculation device according to claim 1, wherein
   the certain object is a product that is sold in a shop,
   the first person is a customer who visits to the shop, and
   the index value indicates the probability that the certain object is purchased by the customer.

3. The calculation device according to claim 1, wherein
   the index value includes a first index value indicating first probability that the certain object is shared between the first person and the one or more second persons.

4. The calculation device according to claim 3, wherein
   the processor is configured to calculate a second index value indicating second probability that the certain object is utilized by each of the first person and the one or more second persons individually, and
   the first index value is smaller than a total value of the second index values of the persons.

5. The calculation device according to claim 4, wherein
   the processor is configured to calculate the first index value or the second index value when it is detected in the one image that the first person and the one or more second persons direct the lines of sight to the certain object.

6. The calculation device according to claim 3, wherein
   the processor is configured to estimate whether the first person and the one or more second persons are in a certain relationship in which the persons share the certain object.

7. The calculation device according to claim 6, wherein
   the processor is configured to calculate the first index value when it is determined that the first person and the one or more second persons are in the relationship in which the certain persons shares the certain object.

8. The calculation device according to claim 6, wherein
   the processor is configured to calculate third probability that a group including the first person and the one or more second persons utilizes the certain object, as the first index value, when it is determined that the first person and the one or more second persons are in the certain relationship in which the persons share the certain object.

9. The calculation device according to claim 6, wherein
   the processor is configured to calculate the second index value of each of the first person and the one or more second persons when it is determined that the first person and the one or more second persons are not in the certain relationship in which the persons share the certain object.

10. The calculation device according to claim 6, wherein
    the processor is configured to estimate that the first person and the one or more second persons are in the certain relationship in which the persons share the certain object when the distance between the first person and the one or more second persons is a threshold value or less.

11. The calculation device according to claim 6, wherein
    the processor is configured to calculate the first index value when it is determined that the first person and the one or more second persons are in the certain relationship in which the persons share the certain object and the certain object is an object allowed to be shared.

12. The calculation device according to claim 1, wherein
    the processor is configured to obtain a number of images in which the first person and the one or more second persons direct the lines of sight to the certain object, and calculate the index value, based on the number of images.

13. A calculation method executed by a processor, the calculation method comprising:
    identifying a first person in a plurality of images captured in time series respectively;
    obtaining gaze information indicating a direction of a line of sight of the person by calculating a gaze vector of the person and calculating a gaze position of the person based on the calculated gaze vector;
    identifying at least one of a time period in which the person directs the line of sight to a certain object and a number of times that the person directs the line of sight to the certain object, based on the gaze information and a position at which the certain object is placed;
    determining a distance between the first person and one or more second persons who are identified in at least one image from among the plurality of images, and determining whether there is a high probability that the first person and the one or more second persons have a human relationship based on the distance between the first person and the one or more second persons; and calculating an index value indicating probability that the certain object is utilized, based on whether there is a high probability that the first person and the one or more second persons have a human relationship, and at least one of the time period and the number of times.

14. A non-transitory storage medium storing a calculation program for causing a computer to execute a process, the process comprising:
   identifying a first person in a plurality of images captured in time series respectively;
   obtaining gaze information indicating a direction of a line of sight of the person by calculating a gaze vector of the person and calculating a gaze position of the person based on the calculated gaze vector;
   identifying at least one of a time period in which the person directs the line of sight to a certain object and a number of times that the person directs the line of sight to the certain object, based on the gaze information and a position at which the certain object is placed;
   determining a distance between the first person and one or more second persons who are identified in at least one image from among the plurality of images, and determining whether there is a high probability that the first person and the one or more second persons have a human relationship based on the distance between the first person and the one or more second persons; and
   calculating an index value indicating probability that the certain object is utilized, based on whether there is a high probability that the first person and the one or more second persons have a human relationship, and at least one of the time period and the number of times.

15. A calculation device comprising:
   a memory; and
   a processor coupled to the memory and the processor configured to:
      detect a first person and a second person in an image,
      obtain, from the image, first information and second information, the first information indicating at least one of a first time period in which the first person directs a line of sight to an object and a first number of times that the first person directs the line of sight to the object, the first information being based on a first gaze vector that is calculated for the first person and a first gaze position of the first person that is calculated based on the first gaze vector, the second information indicating at least one of a second time period in which the second person directs a line of sight to the object and a second number of times that the second person directs the line of sight to the object, the second information being based on a second gaze vector that is calculated for the second person and a second gaze position of the second person that is calculated based on the second gaze vector,
      estimate a distance between the first person and the second person on the basis of the image, and
      calculate a first index value on the basis of the first information and the second information when the distance is in a condition, and calculate a second index value and a third index value on the basis of the first information and the second information respectively when the distance is out of the condition, the first index value indicating probability that the object is utilized by a group including the first person and the second person, the second index value and the third index value indicating probability that the object is utilized by the first person and the second person respectively, the first index value being smaller than a total value of the second index value and the third index value.

* * * * *